United States Patent Office 2,938,835
Patented May 31, 1960

2,938,835
PRODUCTION OF MUTANTS OF THE GENUS PENICILLIUM

Robert Sinclair Chadwick Aytoun, Stoke Poges, and Robert Wilfrid McWilliam, Hanwell, London, England, assignors to Glaxo Laboratories Limited, Greenford, England, a British company No Drawing. Filed May 7, 1956, Ser. No. 582,927

Claims priority, application Great Britain May 16, 1955

4 Claims. (Cl. 195—78)

This invention is concerned with the production of new mutant strains of the mould Penicillium, and their use in the fermentation production of griseofulvin.

Various techniques for artificially inducing mutation of organisms, involving the use of X-rays and ultra-violet radiations, or of chemical mutagenic agents such as mustard gas, have been used in the past and have had some success in the production of novel strains of organism.

In the co-pending application for Letters Patent Serial No. 573,621 of Alan Rhodes et al., now U.S. Patent No. 2,843,527, commonly assigned herewith, there is described the production of the antibiotic griseofulvin by the cultivation under submerged aerobic conditions of griseofulvin-producing organisms of the genus Penicillium, notably certain strains of *Penicillium patulum*.

We have now found that if a griseofulvin producing strain of the genus Penicillium is cultured on or in a nutrient medium in which the greater part of the nutrient sulphur source is in the form of the radioactive sulphur isotope of mass number 35($S^{35}$), mutations occur which result in new strains having an enhanced griseofulvin-producing power as compared with the unmutated parent strain.

While our new mutation technique, in common with others already known, gives rise to a variety of mutants of differing power to produce griseofulvin, we have found that not only does the new method result in a greater percentage of viable mutant spores but also the percentage of the viable mutant spores which have enhanced griseofulvin-producing power is surprisingly increased as compared with other mutation techniques which we have investigated. As a result we have been able to develop new strains which are in fact of higher griseofulvin-producing power than any strain previously known to us.

While we do not wish to be limited by any theoretical considerations, we believe that our novel method of mutation may be briefly explained as follows:

Induced mutation has generally been held to be due to general damage to the reproductive mechanism of the cell, and particularly to the genes responsible for the transmission of the cell's characteristics. Thus, mutagenic agents such as mustard gas are believed to function by reason of a general chemical attack on the molecules of the reproductive mechanism, and radiations of various kinds are thought to act either by energy absorption leading to disruption of the nucleoproteins or by causing ionization of the cell contents to yield highly active free radicals which again make a general chemical attack on the cell. It will be seen that such techniques as these are of necessity indiscriminate in application and bring about general damage to the cells.

The present invention however is based on the assimilation by the cell of a radioactive sulphur isotope, whose effectiveness in bringing about mutation is believed to be due to the fact that functional groups containing sulphur are often linked with certain enzyme functions and in consequence when the radioactive sulphur isotope is incorporated into the sulphur-containing cell constituents, particularly the genes and other characteristic transmitting apparatus, its subsequent radioactive decay, i.e. its conversion to chlorine brings about a specific attack on these functions with fewer background effects. The mode of operation, as will be more fully explained, is to culture the griseofulvin-producing parent strain in the presence of a source of the radioactive sulphur isotope $S^{35}$, which may conveniently be in the form of a sulphate. The sulphur is assimilated by the cell and incorporated into its genic system by the normal growth processes. As $S^{35}$ has a conveniently short half life of about 87 days, rather less than 1% of the sulphur atoms undergo radioactive decay daily. Upon decay $S^{35}$ is transmuted into $Cl^{35}$, that is the chlorine isotope of mass number 35, and thus any grouping containing it is likely to lose its original function. If the affected grouping was significant for the function of the gene, its alteration or destruction should result in the occurrence of mutation.

The method is convenient to use, and not only is it capable of giving a consistently higher yield of viable mutants of the genus Penicillium than other methods already known, which fact is in itself advantageous, but it is also surprisingly found that of these viable mutants a higher proportion are better in their power to produce griseofulvin than is the case if known mutation methods are utilized.

In accordance with the invention therefore we provide a method of producing, by mutation, one or more griseofulvin-producing strains of the genus Penicillium having enhanced productivity as compared with the unmutated parent strain, which comprises culturing a parent griseofulvin producing organism of the genus Penicillium on or in a nutrient medium able to support growth and sporulation thereof, a substantial proportion of the source of nutrient sulphur in said medium being in the form of the radioactive $S^{35}$ isotope, and the culture being continued until spores are formed.

The invention also includes the step or steps of separating the putative mutant spores thus obtained, isolating and cultivating colonies derived from individual spores, followed by screening and selection of such strains as demonstrate an enhanced griseofulvin-producing power when compared with the unmutated parent stock.

While the mutation process of the present invention is applicable to all griseofulvin-producing strains of the genus Penicillium, it may preferably be applied to strains of *Penicillium patulum*, and we have found that a particularly suitable parent strain is *Penicillium patulum* Bainier-Thom (4640, 455) deposited in the culture collection at the Commonwealth Mycological Institute at Kew, Middlesex, England, under number 39,809, and deposited in the culture collection at the Northern Regional Research Laboratory at Peoria, Illinois, under the number 989 and the name *P. uticae* Bain (A)—G. Smith 1949.

The invention will now be more particularly described under the following main headings:

(1) Technique for mutation of the organism;
(2) Selection of mutant strains showing enhanced power to produce griseofulvin;
(3) Use of the selected strains in the large-scale fermentation production of griseofulvin.

1. TECHNIQUE FOR MUTATION

As already stated, the method of mutation according to this invention relies upon the metabolism by the organism of sulphur in the form of the $S^{35}$ isotope. The culture medium used in the mutation stage, apart of course from other factors necessary to support growth and sporulation of the mould, must therefore contain a substantial part of its nutrient sulphur in the form of $S^{35}$. While any type of suitable nutrient medium can be employed provided that at least part of the sulphur present is $S^{35}$, we prefer to use inorganic "synthetic" media owing to the greater ease with which the nature of the sulphur compounds present in such media can be controlled.

A preferred procedure for effecting mutation will now be described by way of example only:

A "minimal" medium is prepared which contains the essential elements for the nutrition and growth of the mould, each element being present in a simple form which yet can easily be assimilated. The "minimal" medium preferably used is that described by Bonner in Arch. Biochem., 13, 1–9, modified by the exclusion—so far as possible—of all sulphur. This modified minimal medium may be made up as follows:

*Medium I.—Modified Bonner "minimal" medium*

|  | Gms. |
|---|---|
| Sodium nitrate | 3 |
| Potassium dihydrogen phosphate ($KH_2PO_4$) | 1 |
| Magnesium chloride ($MgCl_2.6H_2O$) | 0.5 |
| Ferric chloride ($FeCl_3$) | 0.1 |
| Sucrose | 30.0 |
| Well washed agar | 20 |
| Distilled water to 1000 ml. | |

The pH of the medium should be adjusted to 6.8–7.2, using dilute sodium hydroxide. In practice a convenient quantity of the medium is prepared and 2 ml. placed in each of several 25 ml. conical flasks. These are sterilized in an autoclave, and set aside until needed.

When a series of mutation experiments is to be carried out, a convenient quantity of $S^{35}$ in the form of carrier-free sulphuric acid is obtained, and neutralized with sodium hydroxide. 0.2 millicuries of $S^{35}$ are added to each of the 25 ml. conical flasks, which are then resterilized in the autoclave. When the medium in each flask has cooled and set, one or two drops of a spore suspension of the organism to be treated is transferred into each flask, and spread over the surface of the medium by agitation. The flasks are then placed in an incubator at 24° C., and left there till required. We have found that in practice the mould in general grows and sporulates during the first 6–8 days, after which growth and sporulation virtually cease as the medium becomes exhausted. During its growth the mould assimilates and metabolizes the radioactive sulphur, which gradually decays radioactively at a rate of between ½% and 1% per day; 50% of the $S^{35}$ has decayed to $Cl^{35}$ after the half-life period of 87 days.

Naturally the spores produced by the mould during the mutation stage described above have not necessarily all undergone mutation, nor do all those that have been mutated possess an enhanced power to produce griseofulvin, albeit a higher proportion have been found to do so than when using methods hitherto known. It is therefore necessary to select from the resultant culture those mutated spores which have an enhanced griseofulvin-productivity.

2. SELECTION OF PRODUCTIVE MUTANT STRAINS

The selection of the desired strains from the culture may be effected by isolating and culturing individual spores derived from the mutation stage, and selecting such cultures for further study as show greater griseofulvin-productivity than control cultures of the parent strain. This can conveniently be done by making a spore suspension at such dilution that on plating out small quantities of the suspension on suitable nutrient media, each viable spore will give rise to a distinct colony, each of which colonies is then used to seed a small-scale test fermentation to determine its griseofulvin-productivity by subsequent assay, for the purpose of effecting a primary screening, followed by further testing of selected strains.

A suitable technique is for example as follows:

After the mutation stage, spores are removed from the agar surface in the conical flasks by introducing into each flask 3 ml. of sterile calsolene solution and a few glass beads. By carefully shaking the flask, spores are washed off the surface and a suspension obtained. A haemacytometer estimation of the number of spores per ml. in this suspension is then obtained. A proportion of these spores have been killed by the action of the $S^{35}$ or become inviable due to the age of the culture. It has been found that after the mould has been growing for about 28 days, only about 5% or less of the spores remain viable. Using this figure in conjunction with the haemacytometer count, the suspension is diluted with saline so as to give a final concentration of approximately 1000 viable spores per ml. Portions of 0.1 ml. of this diluted suspension are then transferred to a solid malt-agar medium in Petri dishes; each portion—containing about 100 viable spores—is spread evenly over the agar surface, one 0.1 ml. portion being used for each dish. The Petri dishes should then be incubated at 24° C. for three days, by which time the viable spores have germinated and grown to form visible and distinct colonies about 1–2 mm. in diameter.

The malt-agar medium mentioned above may be made up as follows:

*Medium II.—Malt-agar medium*

| | |
|---|---|
| Malt extract | gms.. 30 |
| Agar | gms.. 25 |
| Tap water to 1 litre | pH__ 5.9±0.1 |

[Autoclaved at 15 lbs. per sq. in. for 15 min.]

A fragment is then removed from each colony, using a sterile needle, and sub-cultured on a malt-agar slope of the same composition. These putative mutants are incubated for about 6 days, and are then ready for testing by the primary screening method.

This consists of transferring loopfuls of spores from the above sub-cultures, and also from controls inoculated from slopes of the parent organism, into 30 ml. glass vials containing 7.5 mls. of the nitro-chalk/brown-sugar medium given below, which are then shaken on a rotary shaker at 24° C.

*Medium III.—Nitro-chalk/brown-sugar medium*

| | Grams |
|---|---|
| Nitro-chalk | 4 |
| Brown sugar (40 pieces) | 60 |
| Muriate of potash (KCl) | 2 |
| Potassium dihydrogen phosphate ($KH_2PO_4$) | 1.5 |
| Magnesium sulphate ($MgSO_4.7H_2O$) | 0.5 |
| Tap water to 1000 mls. | |

[Autoclaved at natural pH (6.1–6.2), at a pressure of 15 lbs. per sq. in. for 15 mins.]

This medium is used not because it gives the highest griseofulvin titres, but because—under the conditions of fermentation in these vials—it gives the most consistent results. These vials are left on the shaker and harvested at the end of 7 days, and assayed as follows.

The contents of each vial, including the controls, is made up to the original volume (7.5 mls.) and the contents emptied and scraped into a 6" x 1" boiling tube, to which is then added twice the volume (15 mls.) of cyclohexane or butyl acetate. The tubes are stoppered with a rubber bung, and fitted with a 14" length of glass tubing to act as a simple reflux air-condenser. The tubes are then heated in a water bath at 70° C. for 1 hour to extract the griseofulvin from the fermentation broth into the cyclohexane or butyl acetate. When the tubes have cooled, an aliquot of the solvent layer is diluted so that estimated griseofulvin concentration is between 5–10 p.p.m., and readings are taken on the ultra-violet spectrophotometer, at 261.5 m$\mu$, 288.0 m$\mu$ and 322.5 m$\mu$. Two independent readings are obtained for each vial. A comparison of the titres given by the putative mutants with those given by the controls reveals any strains showing signs of increased titre over the control, and these strains are chosen and set aside for more accurate testing.

This more accurate testing consists of culturing the mutant strains and the control strain in shake flasks, using the C.S.L.-lactose medium given below inoculated from vegetative flasks.

*Medium IV.—Cornsteep-liquor/lactose medium*

|  | Percent |
|---|---|
| Cornsteep liquor solids | 2.85 |
| Lactose | 7.0 |
| KCl | 0.1 |
| $KH_2PO_4$ | 0.4 |
| Settle limestone | 0.8 |

[Autoclaved at natural pH, and a pressure of 15 lbs. per sq. in. for 20 mins.]

The vegetative inoculum for the above medium is prepared by transferring a loopful of spores of the mutant or control strain from the malt-agar slope into 60 ml. portions of the following development medium, contained in shake flasks.

*Medium V.—Cornsteep-liquor/brown-sugar medium*

|  | Percent |
|---|---|
| Cornsteep liquor | 3.8 |
| Brown sugar (40 pieces) | 2 |
| $CaCO_3$ | 1 |

[Adjust pH to 5.8±0.1 with NaOH. Autoclave at a pressure of 15 lbs. per sq. in. for 20 mins.]

These shake flasks are shaken at 24° C. for 48 hours, by which time a very thick broth is obtained. 3 ml. portions of this broth are used as the inocula for the shake-flask fermentations using the Medium IV above.

These shake-flasks, each containing 60 mls. of Medium IV above, and inoculated as just described, are shaken at 24° C. and assayed from the 5th day onwards as required. It has in practice been found convenient to carry out the assay by extracting the fermentation broth with cyclohexane or butyl acetate (manual shaking); after suitable dilution, the ultra-violet absorption is read on the ultra-violet spectrophotometer at 289.0 m$\mu$ and 315.0 m$\mu$.

Applying the mutation and selection techniques described above to one preferred parent strain, namely C. 554 *Penicillium patulum* Bainier-Thom (4640, 455) C.M.I. 39,809 which itself has a good productivity for griseofulvin, we have found it possible to isolate new strains which have a productivity considerably greater than that of any strain previously known to us, and approximately twice that of the parent strain.

The results actually obtained starting from the above parent strain were as follows. After treatment with radioactive sulphur as previously described, treated spores were harvested after 20, 40 and 62 days respectively, plated out and isolated.

About 750-800 isolates were put through the primary screen, distributed approximately as follows:

200–20 day isolates
460–40 day isolates
120–62 day isolates

From these, 3 of the 20 day isolates and 12 of the 40 day isolates were considered to be promising and passed forward for secondary screening. Of these 15 strains the secondary screening showed that four had mutated to give considerable titre increases over the parent. Of the remainder a few showed small increases in titre of about 10–15% and about 6 failed to confirm their early promise.

The best strain, a 20-day isolate hereafter referred to as S. 152 was carefully examined and its characteristics and performance compared with the parent.

COMPARISON BETWEEN S. 152 AND THE PARENT

As a result of microscopic examination, there appears to be no morphological difference between S. 152 and the parent. If, however, the two strains are grown on malt complete medium in a Petri dish, the dish being inoculated centrally with a few spores on an inoculating needle, and incubated at 24° C. for 9 days the macroscopic appearance of the giant colonies differs slightly. If the colonies are examined on the under side the S. 152 colonies show convolutions as radii from the centre to the edge of the colony which are very regular. In the case of the parent, the underside of the colony shows the beginning of convolutions, but these do not extend more than one-third of the way from the centre to the edge.

Two differences are noticeable in the fermentation of the two strains. In the C.S.L.-lactose fermentation medium (Medium IV), the parent strain C. 554 very frequently gives a pink pigment which is extractable in butyl acetate. This pigment has not been seen in the case of the mutant S. 152.

In order to obtain a dense suspension of submerged spores of the mutant S. 152, the nitrogen level of the submerged spore medium must be cut down to 0.03–0.02% or less. With the parent C. 554 a dense submerged spore suspension can be got with a nitrogen level of 0.05% and even higher.

PERFORMANCE IN FERMENTATION (1) *Primary screening.*—In the primary screen an experiment on the selected mutant strain and on a control of the parent strain was carried out by fermentation in 30 ml. vials on nitro chalk-brown sugar medium. Assay was made by extraction with cyclohexane and measurement on the u./v. spectrophotometer.

The results obtained were as follows:

*Table I*

| Strain | Yield after 7 days, in mgm./ml. | |
|---|---|---|
| Parent | 75 | 90 |
| S. 152 | 132 | 167 |

(2) *Secondary screening.*—In the secondary screen a similar test fermentation was made using a C.S.L.-lactose medium (60 mls.) in shake flasks, and a vegetative inoculum. Griseofulvin was extracted with butyl acetate and the yield read on the u./v. spectrophotometer. The following titres were obtained:

*Table II*

[Titres expressed in mgm./ml.]

| Day of fermentation | S. 152 | Parent |
|---|---|---|
| 5th day | 745 | 317 |
| 7th day | 1,612 | 728 |
| 10th day | 2,350 | 1,715 |
| 13th day | 2,960 | 1,640 |
| 18th day | 3,435 | 1,395 |

In order to demonstrate further the differentiation between the mutant strain and the parent we give below the results of a similar test fermentation using a nitro-chalk medium:

*Table III*

[Titres expressed in mgm./ml.]

| Day of fermentation | S. 152 | Parent |
|---|---|---|
| 5th day | 805 | 500 |
| 7th day | 750 | 525 |
| 10th day | 1,010 | 645 |
| 13th day | 650 | 355 |

(3) *Use of the selected mutant strains in production of griseofulvin.*—The selected mutant strain obtained is described above may be used in the large-scale fermentation production of griseofulvin without any major modifications of the techniques suitable for the parent strains.

We prefer to employ such mutant strains as give consistently high yields under submerged aerobic fermentation conditions, and one such strain is S. 152 described above. The fermentation media should in general contain a source of assimilable nitrogen, a source of carbon and energy, and nutrient salts or other growth promoting factors. The nitrogen source can conveniently be in the form of complex organic material such as cornsteep liquor, and should be present in such amount as to provide an assimilable nitrogen level of between 0.03 and 0.3%, preferably 0.15–0.2%. The source of carbon and energy may for example be lactose or glucose, at a rather higher level than might be expected, preferably above 6%. The nutrient salts should include a source of chlorine ions, conveniently KCl at a level of about 0.1% or more. The fermentation has also been found to respond favourably to the presence of both phosphate and limestone or chalk, conveniently at levels of about 0.4–0.8% and 0.8% respectively. The pH of the medium is not very critical, but should preferably be adjusted to between 4.5 and 5.5 before the fermentation commences, and tends to rise gradually as it proceeds. The peak titre is usually achieved in about 7–8 days, and is favourably influenced by good aeration.

One medium which we have found suitable for full-scale production with the new mutant strain S. 152 is as follows:

*Medium VI.—Submerged fermentation production medium*

| | |
|---|---|
| C.S.L. solids | 2.85% (=0.15% N). |
| Lactose | 7.0%. |
| KCl | 0.1%. |
| $KH_2PO_4$ | 0.4%. |
| Settle limestone | 0.8%. |
| Natural pH. | |

Best results are generally obtained by inoculation of the production stage medium given above with a freely-growing vegetative inoculum. This may be obtained via the usual stages, namely by growing spores derived from a suitable nutrient agar slope until sporulation occurs, and using a spore suspension thus obtained to inoculate a development stage which yields the vegetative inoculum for the final production stage. A fairly high level of inoculum has been found to be advantageous, say between 1% and 10%.

The production of griseofulvin using the new mutant strain is generally similar to the procedures described in the aforesaid co-pending application Serial No. 573,621, and the extraction of the antibiotic griseofulvin thus produced from the mycelium and from the filtered broth may be carried out by the solvent extraction techniques there described.

We claim:

1. In a method for the production, from a parent strain of griseofulvin-producing organism of the genus Penicillium, of mutant strains thereof having enhanced griseofulvin-productivity as compared therewith wherein said parent griseofulvin-producing strain is cultured using a nutrient medium capable of supporting its growth under conditions which will produce mutant strains and there is isolated from said culture at least one new mutant strain having said enhanced griseofulvin-productivity, the step of incorporating in said medium an assimilable sulphur source, at least a substantial part of which is in the form of the radioactive sulphur isotope of mass number 35.

2. A method as claimed in claim 1, wherein said sulphur source is present in the form of $S^{35}$=sulphate.

3. A method as claimed in claim 1, in which the said nutrient medium is an inorganic synthetic medium.

4. A process as claimed in claim 1 in which the parent strain of griseofulvin-producing organism is *Penicillium patulum* Bainier-Thom (4640, 455) N.R.R.L. No. 989.

References Cited in the file of this patent

UNITED STATES PATENTS 2,455,748    Demerec et al. _____ July 27, 1948

OTHER REFERENCES

De Kruif, Paul: Readers Digest, July 1949, page 49.
Baron: Handbook on Antibiotics, Reinhold Sub. Corp., 1950, pp. 136–138.
Stevens et al.: Jour. Biol. Chem. 205 (1953) pp. 1001–1006.
Arnowitz: Jour. Gen. Microbiology, 10, 1954, pp. 465–474.